S. H. WILEY.
Drafting Scale.
No. 51,375.
Patented Dec. 5, 1865.
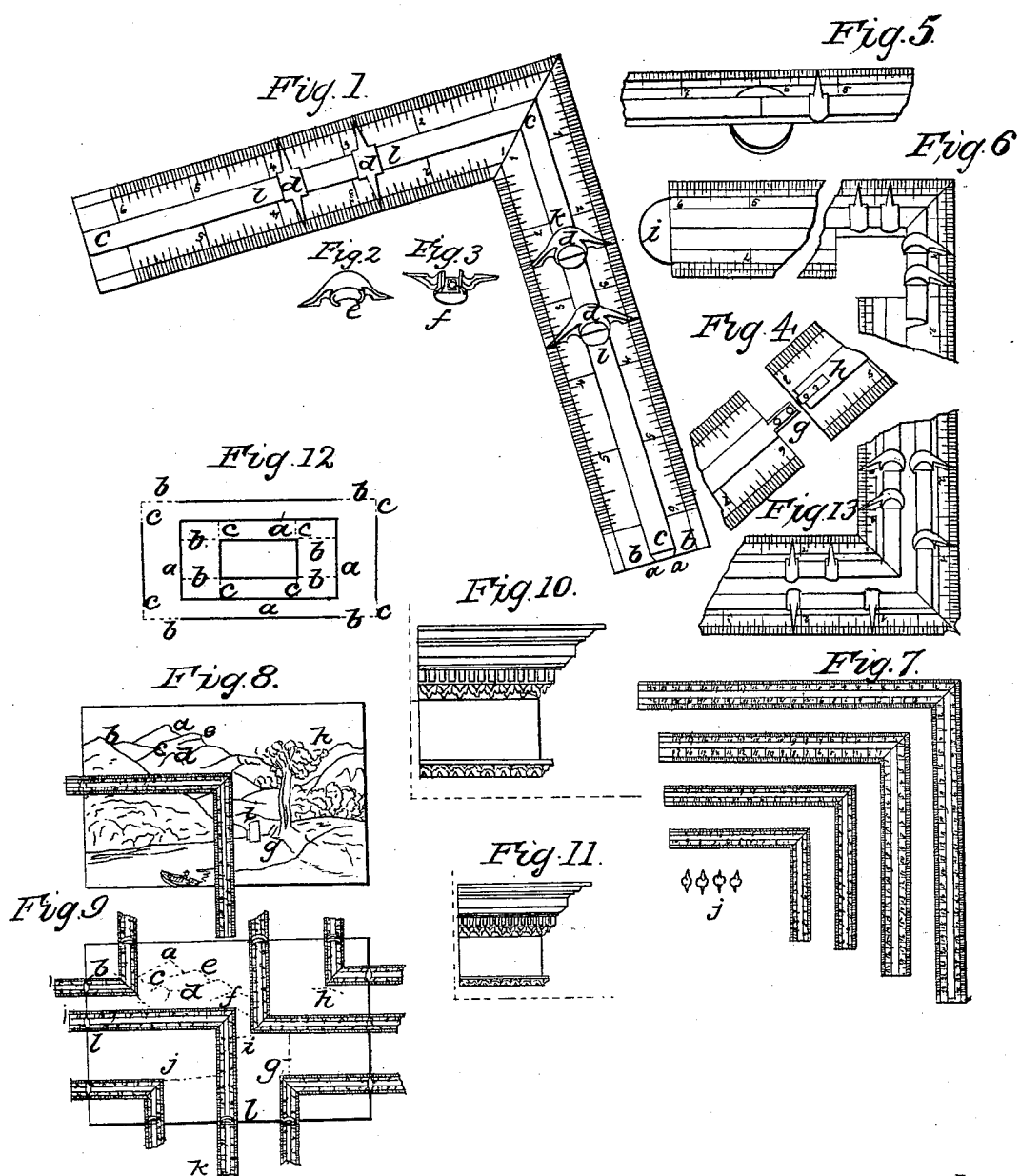

UNITED STATES PATENT OFFICE.

S. H. WILEY, OF SALISBURY, NORTH CAROLINA.

IMPROVEMENT IN DRAFTING-SCALES.

Specification forming part of Letters Patent No. 51,375, dated December 5, 1865.

*To all whom it may concern:*

Be it known that I, S. H. WILEY, of Salisbury, in the county of Rowan, State of North Carolina, have invented a new Mathematical Instrument, styled "Wiley's Computating-Drafter;" and I do hereby declare that the following is a full and exact description thereof, reference being had to the accompanying drawings, which make a part thereof, and to the letters of reference marked thereon.

This instrument is intended to supply what has long been a desideratum with the draftsman—viz., an easy and simple method of copying accurately and expeditiously his rough drafts, and of calculating and changing the dimensions of the same. It is designed specially for the use of the engineer, both civil and military, the architect, the scientific mechanic, and all other professional men in whose drafting exactitude of measurement is indispensable. It will also be found convenient by artists, professional and amateur, by the artisan of every description, and for the use of schools.

In its basis the drafter is precisely similar to the carpenter's common measuring-square, as it is formed by two measuring-rules joined together into a right angle, and marked in the usual manner with the scale of inches and their fractions; but upon each side of this right-angled rule I place two movable hands or pointers, respectively denominated "indicators" and "computators," by which hands or pointers spaces upon the rule are measured and computed, as hereinafter described.

The instrument may be made of any of the following-named materials: platina, brass, steel, ivory, or wood. Its size and construction may likewise be varied indefinitely, as partly illustrated in the accompanying figures.

Figure 1 is a perspective view of the instrument. Its base is perfectly flat, its upper surface slightly sloped at the sides, in order that the edges may rest closely and sharply upon the paper in copying. A ledge one-eighth of an inch in thickness, two-tenths of an inch in width at the base $a\ a$, and three-tenths of an inch in width at the top $b\ b$ runs along the center of the upper surface toward the vertex of the angle $c\ c\ c$, and upon this ledge the indicators and computators $d\ d\ d\ d$ are slid back and forth at pleasure by means of a groove, $e$, Fig. 2, situated in the lower part of each one, and are held stationary, as desired, by a spring, $f$, Fig. 3, placed within this groove.

Figs. 4, 5, and 6, show two modes of extension, Fig. 4 by a tongue, $g$, and a groove, $h$, with screw-fastenings; Figs. 5 and 6 by a joint like that of the sector $i\ i$. Fig. 13 exhibits a section of a drafter the vertex of which is eccentrical, presenting a clear fine point in place of the regular square form. This instrument has two ledges and sets of hands, by which arrangement measurements and computations may be made on the exterior and interior edges at the same time. Fig. 7 represents a set of four drafters of graduated sizes. The ledge upon each of these instruments being of the same dimensions, one set of hands, $j$, will be sufficient for all of them.

In making a fac-simile of a draft—*i. e.*, a copy exact in size as well as proportion—the indicators alone are required. To enlarge or diminish the size of the copy, the computators are likewise employed. In enlarging the two hands nearest the vertex of the angle, $k\ k$, Fig. 1, are used as indicators, and the outside hands, $l\ l$, as a computators. In diminishing size the order of using the hands is reversed.

The manner of using the instrument is as follows: A landscape sketch, Fig. 8, and the paper on which a fac-simile copy of it is to be made are placed side by side, and the marginal outline of the sketch is accurately copied upon the paper. The size of this marginal outline is thirteen and three-fourths by twenty-one and one-half inches. Consequently a blank square of these exact dimensions—thirteen and three-fourths by twenty-one and one-half inches—is traced upon the paper. Next the drafter $k\ k$ is laid down upon the sketch in such position that its vertex just touches the central mountain-peak, $f$. Holding the instrument steadily in this position, each indicator is put exactly on a range with the marginal outline which is crossed by its side of the drafter $l\ l$. Leaving the indicators stationary, the instrument is transferred from the sketch to the blank square of the copy $k\ k$, Fig. 9, and its position upon this blank square adjusted to be precisely what it was upon the sketch $l\ l$. A pencil-dot at the point of the vertex then locates with hair's-breadth accuracy the mountain-peak $f$ upon the blank square. The same process is repeated in locating the peaks $a$, $b$, $c$, and so forth, and in this manner every point and line of the drawing may be as accurately copied as by an engraver's plate.

If the draft to be copied has no definite outline—if it be a landscape, a head, or any other design the background of which fades into indistinctness without a clearly defined limit—it will be necessary to trace lightly around it, and correspondingly upon the blank paper, a temporary pencil-mark square. Unless the depth or breadth of the draft measures more than the drafter used, a pencil-line half-square will suffice for the purpose. (See Figs. 10 and 11.) If the marginal outline be circular, oval, or of any but square form, it will also be necessary to use the temporary square or half-square in copying.

To enlarge or diminish size the two following rules must be observed in computing dimensions:

First, the quantity to be added to or abstracted from the size of the model-draft must be added to or abstracted from the marginal outline of the copy.

Second, the center of the copy must correspond accurately with the center of the model-draft.

Example: I wish to increase or diminish by one-half the size of the draft the marginal outline of which is twelve by six inches, $a\ a\ a\ a$, Fig. 12. The one-half of twelve is six, the one-half of six is three. *Ergo*, I add to or abstract from the model-square $a\ a\ a\ a$ six by three inches. This quantity must be considered as added to or abstracted from the four sides of the copy-square in equal proportion, and to do this the quantities six inches and three inches are divided by two, a moiety of each being added to or abstracted from each extremity of the four lines that form the square. Thus, of the quantity six inches, one-half, or three inches, is added to or abstracted from the top and base marginal lines of the copy-squares $b\ b\ b\ b\ b\ b\ b$; of the quantity three inches, one-half, or one and one-half inches, is added to or abstracted from the side marginal lines of the copy-squares $c\ c\ c\ c\ c\ c\ c$. By this means the center of the copy is made to correspond accurately with the center of the model, and each computation must be regulated by this fact when locating points upon the copy—i. e., one-half only of the quantity which is to be added to or abstracted from the size of the model-draft must be added to or abstracted from its actual distances in transferring them to the copy. Thus, to increase or diminish size one-half, one-fourth is added to or abstracted from each distance on the model-draft as it is located on the copy; to increase or diminish size one-third, one-sixth is added to or abstracted from each distance on the model-draft as it is located on the copy; to increase or diminish size one-fourth, one-eighth is added to or abstracted from each distance on the model-draft as it is located on the copy; to increase or diminish size one-fifth, one-tenth is added to or abstracted from each distance on the model-draft as it is located on the copy, and so on with all fractional quantities.

It is to be particularly noted that when a draft is to be enlarged by its whole quantity in the ratio of two—that is, by the numbers 2, 4, 8, 16, &c., *ad infinitum*—then the whole quantity of increase must be added to the actual distances on the model at the location of each point upon the copy, because, in enlarging by whole quantities in the ratio of two, the area of the copy-square is quadrupled instead of doubled at every successive increase.

Example: I take a draft twelve by twelve inches and enlarge its dimensions by one whole quantity, or to twice its size. This gives me a square twenty-four by twenty-four inches—an area precisely four times that of my model. I double this again, obtaining thereby a square forty-eight by forty-eight inches, and the area of this latter is four times that of the twenty-four by twenty-four inch square, and sixteen times that of the twelve by twelve inch square. If, however, I enlarge by whole quantities in any but the regular ratio, two—as for instance, by the numbers 3, 5, 7, &c.—or if I add a fractional quantity, great or small, to a whole quantity or quantities in the regular ratio, then the irregular whole quantities, or the fractional quantity added to the regular whole quantity or quantities, is subject to the rule of fractional quantities. Thus, to increase size three whole quantities, one and one-half is added to each distance on the model-draft in locating it upon the copy; to increase size five whole quantities, two and one-half is added to each distance on the model-draft in locating it upon the copy; to increase size one and one-tenth whole quantities one and one-twentieth is added to each distance on the model-draft in locating it upon the copy; to increase size two and four-sixths or two-thirds whole quantities, two and two-sixths or one-third is added to each distance on the model-draft in locating it upon the copy, &c.

The mechanical principle of Wiley's computating-drafter is simply that of constituting the vertex of its exterior angle a fixed point, from which point distances on the draft to be copied are measured, marked, and computed upon the sides of the instrument, and thence transferred to the copy; or, in other words, the considering each point upon a draft as a vertex of a right angle, the dimensions of which angle are marked upon the drafter and thence transferred to the copy.

The invention claimed is—

1. The placing upon the sides of a right-angled measuring-rule two movable hands or pointers, by which hands or pointers spaces upon the rule are measured and computed, as described in specification.

2. The application of the instrument thus produced to the copying by measurement, either in exact, enlarged, or diminished size and proportion, drafts and pictures of all kinds.

S. H. WILEY.

Witnesses:
R. S. HEURICK,
C. L. COOMBS.